Figure 1:
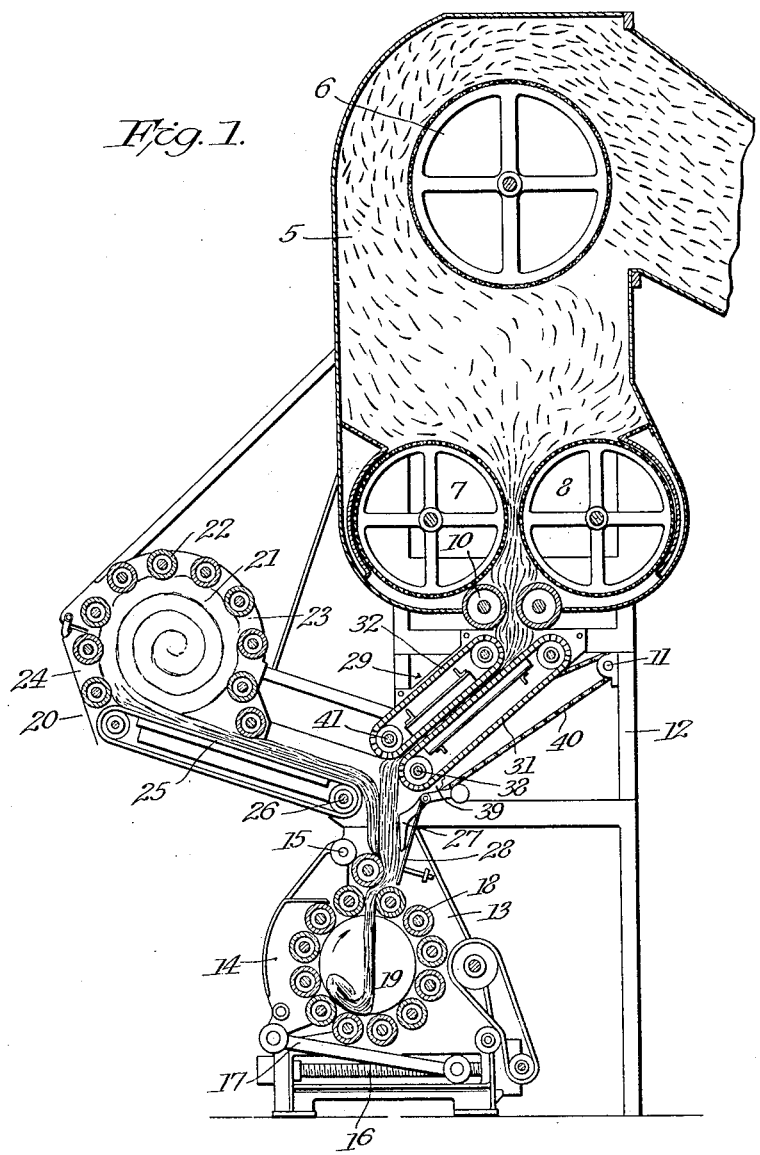

Oct. 11, 1932.  A. S. MACKENZIE  1,881,774
APPARATUS FOR BALING MATERIAL
Filed April 10, 1928  2 Sheets-Sheet 1

Inventor
Alexander S. Mackenzie
By Cushman, Dupont Warby
Attorneys

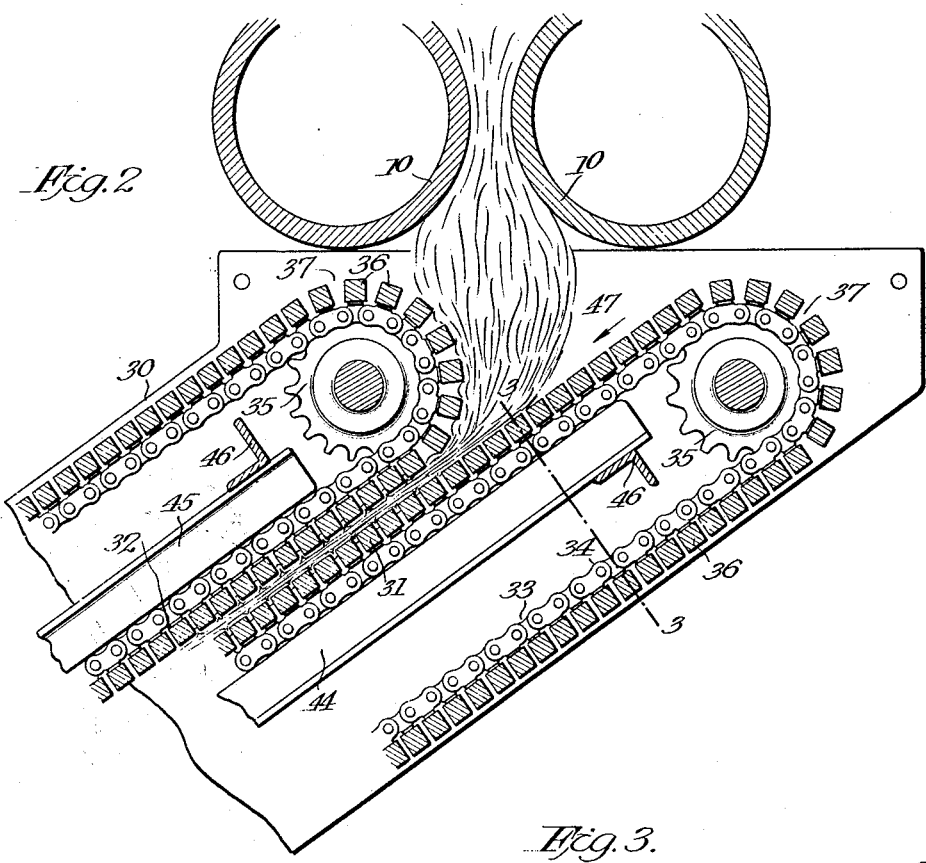
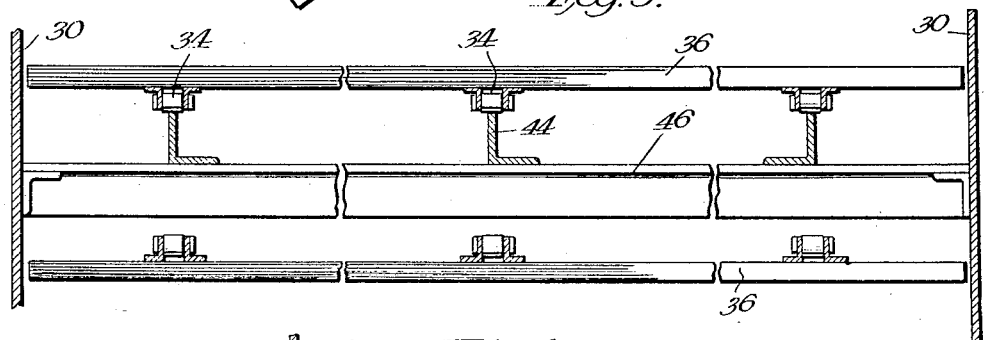
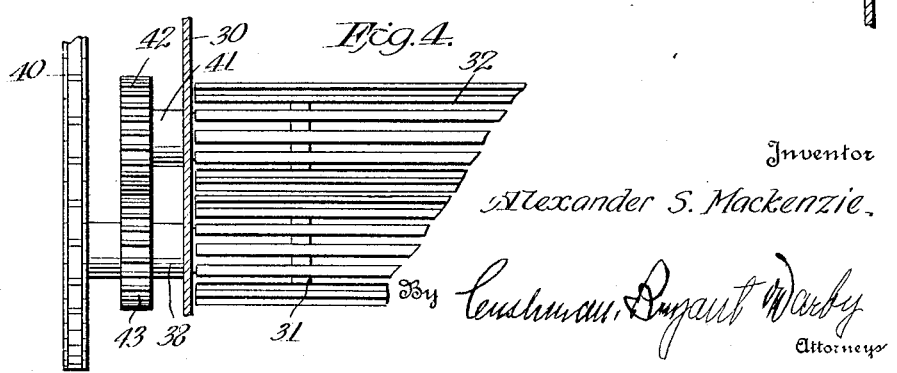

Patented Oct. 11, 1932

1,881,774

UNITED STATES PATENT OFFICE

ALEXANDER S. MACKENZIE, OF HOUSTON, TEXAS, ASSIGNOR TO CLAYTON GIN COMPRESS COMPANY, OF HOUSTON, TEXAS, A CORPORATION OF TEXAS

APPARATUS FOR BALING MATERIAL

Application filed April 10, 1928. Serial No. 268,884.

This invention relates to a method and apparatus for baling material into any shape bales, and the primary object of the invention is to provide means for preliminarily compressing the material prior to its admission into the baling press, in order that the baled material will possess greater density, especially at its center in round bales, and in order that less time will be required in forming bales than with the machinery at present known and used, which means a saving in the power required to carry out the baling operations.

It has been the practice heretofore in forming round bales of cotton to permit the cotton bat to drop in an expanded state from the condenser rolls directly into the round bale press, under which conditions considerable time elapses before sufficient cotton is accumulated in the press to cause rolling of the bat, and before actual compression takes place in the press, and this is attributed to the fact that the bat fed into the press is not sufficiently compressed, with the result that it becomes simply a rumpled mass, instead of at once beginning to roll within the press. This obviously, results in a comparatively loose mass of rumpled cotton, which, as the baling operation proceeds, becomes a sufficient size to be positively rolled by the press rolls and subsequently compressed by the outer layers of the bat. Such method of making bales naturally results in the bales having loose cores, which are not compressed to the degree of density possessed by the outer layers of the bale, and bales of cotton of uniform density are obviously not produced by such methods heretofore employed.

In my improved method and apparatus, these objections are eliminated to a large extent through the primary compression of the bat, since the bat will begin its rolling movement within the press chamber sooner, and will be wound in a uniform manner, so that actual compression of the bale will begin later to produce a bale having an extremely dense center or core, with the result that the outer layers of the bale will be less dense, in order to form a bale having a certain poundage or weight for a predetermined size, due to the increased density at the center of the bale. Furthermore, since actual compression of the bale will begin later with my improved method and apparatus, a prolonged compression of the bale is unnecessary in order to produce a bale of definite size and density, and a decrease in the time required to press the bale is effected, with a consequent saving in the power necessary to form a complete bale.

Another important object of the invention is to provide a preliminary compression instrumentality at a location where it can feed the compressed material either to a baling press or to an accumulator, as it has been found that remnant bales formed by the accumulator can be re-rolled to much greater advantage than when the bat is fed to such accumulators directly from the condenser rolls, and without the preliminary compression referred to herein, in view of the fact that a denser bat is formed by my improved method and apparatus, so that it is much mode well defined, and will more readily unwind from a remnant bale and feed into the baling press.

Another important object of the invention resides in the provision of a preliminary compression instrumentality, which is arranged to form a hopper for the reception of the material being fed thereto, the construction of the compression instrumentality being such as will constantly grip and compress the material in two different directions to increase its density and prevent its elongation, and will automatically release its grip upon the material at its discharge end.

Other objects and advantages of the invention will become apparent during the course of the following description:—

In the accompanying drawings forming a part of the application, and wherein like numerals are employed to designate like parts throughout the several views, Figure 1 is a vertical section taken through the entire apparatus, Figure 2 is an enlarged similar section of the receiving end of my improved preliminary compressing instrumentality, Figure 3 is a transverse section taken through the same on the line 3—3 of Figure 2, looking in the direction of the arrow, and Figure 4 is an enlarged fragmentary plan of the power instrumentality for said preliminary compressing instrumentality.

Referring now in detail to the drawings, a condensing mechanism of the usual type is indicated by the numeral 5, having in its upper end the ordinary screened drum air outlet 6 and a pair of juxtaposed screen drums 7 and 8 forming air and dust outlets, with a feeding passage therebetween for feeding cotton down between a pair of condenser rolls 10, which are rotated in opposite directions by the usual type of power transmission from a power shaft 11, mounted in bearings on the usual frame or tower 12.

A round bale cotton press of the type specifically disclosed in my co-pending application, Ser. No. 246,491, filed January 13, 1928, is indicated by the numeral 13, and includes a swinging jaw 14 moving about a pivot 15 by means of power driven screws 16 and connecting pitman 17 to effect discharge of the baled material. Such presses, of course, include a series of baling rolls 18 carried by the stationary and movable portions of the press frame, and arranged in a circle to define a cylindrical baling chamber 19, in which the cotton bat is rolled up and compressed to the desired density. This baling press is mounted below the condenser rolls 10, and to one side of a perpendicular line drawn between the condenser rolls. This baling press may be of any desired type, and may be of a nature to form bales of cylindrical, square, or any other formation.

In order to provide for a continuously operative mechanism, and one in which the material coming from the condenser rolls does not have to be cut off or stopped upon completion of one bale and discharge thereof from the baling press, an accumulator 20, such as is specifically disclosed in my co-pending application, Ser. No. 59,566, filed Sept. 30, 1925, is associated with the inlet of the press 13 in a manner disclosed in said co-pending application. This accumulator consists essentially of the bale forming chamber 21, formed by a series of baling rolls 22 arranged in a cylinder carried by a stationary jaw 23 and a movable jaw 24 of the accumulator, as well as by one end of a reversible endless apron 25, which serves, in one direction of its movement, to receive the bat from the condenser rolls and feed it into the accumulator chamber 21, or, during the reverse movement of the apron 25, to feed the bat of the remnant bale from the accumulator chamber to the mouth of the baling press 13. This movable jaw 24 of the accumulator is movable about the shaft 26, as an axis, so that it may be lowered to the floor to discharge the remnant bale from the accumulator, and to carry said bale back to the accumulator chamber, where it may be re-rolled for delivery to the baling press.

In order that the cotton bat from the condenser rolls may be selectively directed either to the accumulator 20 or the baling press 13, a bat slide 27, similar to the slide 17 of the aforesaid pending application, is similarly mounted and actuated, and a deflector plate 28 is arranged therebelow and within the press for directing the bat between the uppermost feeding rolls thereof.

To effect the purposes of my invention, a preliminary compressing instrumentality, indicated by the numeral 29, is mounted upon the tower 12 between the condenser rolls 10 and the mouths of the press and accumulator, as best seen in Fig. 1 of the drawings. In the present illustration of the invention, this compressing instrumentality is mounted between spaced side parallel plates or frames 30 secured to the tower 12 in any suitable manner. This instrumentality comprises, in the present instance, a pair of inclined superposed parallel endless carriers 31 and 32, each of which is composed of three endless chains 33, comprising a plurality of pivotally connected links, the pivots of which carry rollers 34, and are adapted to mesh with their sprockets 35. Each of the individual links of the three chains have secured thereto transverse square steel bars 36, forming aprons in the nature of compressing instrumentalities. The bars 36 of each apron are arranged in juxtaposed relationship, and when forming the rectilinear runs of the apron, are slightly spaced apart, as clearly shown in Fig. 2, this separation or space between the bars of an individual apron being automatically enlarged, as shown at 37 in Fig. 2, when the bars are moving about their sprockets 35, for a purpose to be presently described.

The lower sprocket shaft 38 of the lower apron has a sprocket 39 keyed thereto beyond one of the side plates 30 for the reception of a sprocket chain 40 driven by the power shaft 11 of the condenser. The lower sprocket shaft 41 of the upper apron has a gear 42, shown in Fig. 4, meshing with a gear 43 of the same size, keyed to the shaft 38, so that power transmitted through the chain 40 will drive the two aprons 31 and 32 at the same speed, and with their adjacent parallel runs in the same direction indicated by the arrow in Fig. 2.

It will be noted that the adjacent innermost runs of the two aprons 31 and 32 are arranged in parallelism, and spaced apart the distance it is desired to compress the material, the compressing effect of these adjacent runs and their predetermined spacing being obtained by the provision of the plurality of runners 44 arranged beneath the uppermost run of the lower apron 31 and a similar set of runners 45 arranged above the lower run of the upper apron 32. These runners are arranged so that the rollers 34 of the apron chains will run along their longitudinal edges, as best shown in Fig. 2. These runners are all secured to transverse angle irons 46 secured to the side plates or frames 30. Due to this arrangement, it will be seen that separation of the adjacent runs of the superposed aprons cannot occur, and will cause constant and uniform compression of material fed therebetween in a direction at substantially right angle to the direction of travel of the material.

The inlet end of the preliminary compressing instrumentality is arranged to provide a hopper 47 into which the material is fed from the condenser rolls 10, and is accomplished by making the lower apron 31 longer than the upper apron 32 and extending the upper end of the lower apron beyond the upper sprocket 35 of the upper apron, so that a portion of the upper apron passing about the upper sprocket and a portion of the upper run of the lower apron 31 provide a pair of movable converging walls serving in the capacity of a hopper.

In operation, cotton from the condenser rolls 10 is fed into the hopper 47, where the bars 36 of the upper carrier, when passing about the upper sprocket 35, separate and permit entrance of the cotton in the spaces between the bars, so that when they come down around the sprocket, and move downwardly toward the press, they will automatically move together, and grip and compress portions of the cotton therebetween, in a direction parallel to the movement of the carriers and material as if each two bars were a box. In order that this longitudinal compression of the cotton may affect a maximum amount of fibres in the bat, I have positioned the two carriers in such relation to each other that they cooperate to positively force portions of the bat into the spaces between the bars while the bars are in their diverged relation. It will be noted that the point of maximum transverse compression of the bat is reached when the upper carrier 32 leaves the sprocket 35. Prior to this point, the carrier has been moving around the sprocket with the bars 36 in diverged relation and has been approaching the lower carrier 31. Thus, the two carriers converge toward each other while approaching the point of maximum transverse compression with the bars of one carrier spaced apart in position to receive therebetween, portions of the bat forced thereinto by the two carriers. In order that this desirable mode of operation may be accomplished, I find it advantageous to definitely position the feeding means for the bat compressor to deliver the bat to the mechanism so that the bat contacts the bars while they are rounding the sprocket and are in diverged relation. If the feeding means were otherwise positioned, longitudinal compression of portions of the bat would be impossible. Movement of the adjacent runs of the two aprons being in the same direction downward, and at the same speed, will cause the cotton to be preliminarily compressed into a fairly dense bat, the fibers of which will be prevented from elongation or stretching by the gripping action of the bars 36 thereon. It will thus be seen that the two endless carriers 31 and 32 will effect compression of the material at right angles to its direction of travel downwardly and also that portions of the material will be clamped and compressed between the pairs of bars 36 of the upper carrier 32 as these bars separate in passing around the head sprockets 35 and subsequently close upon the material as they straighten out into the lower run of the carrier. This compressed bat is then fed downwardly of the apparatus, to be discharged at its lower end where the bars 36 spread to release the gripped cotton, from whence it passes directly down into the press 13, when the bat slide 27 is disposed in the position shown in Fig. 1, or to the apron 25 of the accumulator, in case the bat slide is arranged in its other position to direct the bat away from the press.

When the bat slide 27 is in position to feed the cotton bat to the baling chamber of the press, the carriers 31 and 32 supply the press with a compressed bat, which is very much thinner than a bat going to the press without the use of these compression aprons or carriers, the result being that the bat, upon entering the press, immediately rolls into a much smaller roll and there is consequently a greater quantity of cotton in the press before compression by the press starts. This preliminary compression of the bat causes the bale to have greater density at its center than one formed of a bat not given this high degree of preliminary compression. Obviously then, early compression of the rolled bat by the press is deferred by the highly compressed condition of the bat and power ordinarily used by the press in compressing the ordinary loose bat is saved with the advantageous result of the period of compression by the press being reduced or made of shorter duration. This eliminates a great portion of the damage to cotton caused from a long period of working under compression. It also results in the formation of a bale of requisite size having greater density at its center than in the outer layers of the bale and is the reason for the saving of power at the peak of the load.

Upon completion of the bale in the press, the bat slide 27 is shifted, after the bat has been severed in any suitable way, to a position to direct the preliminarily compressed bat coming from the aprons, onto the apron 25 of the accumulator, which directs the compressed bat, before it has opportunity to expand, to the baling chamber 21 of the accumulator 20, where it begins immediately to be rolled into a cylindrical, rounded bale, by means of the baling rolls 22 and cooperation of the apron 25. In the meantime, the completed bale in the press 13 is being bagged, and the movable jaws 14 opened to discharge the bale therefrom, after which they are caused to close, again ready to receive the preliminarily compressed bat from the compressing instrumentality 29, as well as the bat from the remnant bale in the accumulator, upon reversal of the direction of movement of the accumulator apron 25, so as to simultaneously feed the bat from the accumulator and the preliminary compressing instrumentality into the press 13. It has been noted in actual practice, that the distance between the discharge end of the preliminary compressing instrumentality 29 and the throat of the press 13 is so small as not to permit appreciable expansion of the compressed bat to its size before entering the compressing instrumentality. Furthermore, it has been found in actual practice that this apparatus effects a net saving of six kilowatts per bale over the apparatus heretofore employed, without the preliminary compressing instrumentality.

It will, of course, be understood that various changes in the shape, size, and arrangement of parts may be resorted to, without departing from the spirit of the invention or the scope of the appended claims.

I claim:—

1. A compressing instrumentality comprising a pair of superposed aprons having their adjacent runs arranged in parallelism for compressing action therebetween, sprockets at the ends of said aprons, one of said aprons including a plurality of relatively movable bars adapted to close together when passing away from its said sprocket to grip and compress material therebetween as the aprons move the material longitudinally therewith, and means to feed material up against and in between said bars as they change their direction in moving about said sprocket.

2. A compressing mechanism for compressing a bat of cotton delivered thereto from a feeding means, said mechanism comprising a pair of superposed aprons having their adjacent runs arranged for compressing said bat therebetween, a sprocket at one end of one of said aprons about which said apron is trained, said apron comprising a plurality of spaced transverse bars arranged to diverge when said apron rounds said sprocket and to converge when said apron leaves said sprocket, said bat feeding means being positioned to deliver said bat to said mechanism to contact said bars while the same are rounding said sprocket and are in diverged relation, whereby converging movement of said bars when leaving said sprocket serves to grip said bat and to compress portions thereof between said bars longitudinally of the movement of said aprons.

3. A compressing mechanism for compressing a bat of cotton delivered thereto from a feeding means, said mechanism comprising upper and lower superposed aprons having their adjacent runs arranged in parallelism for compressing said bat therebetween, a sprocket at one end of said upper apron about which said apron is trained, said apron comprising a plurality of spaced transverse bars arranged to diverge when said apron rounds said sprocket and to converge when said apron leaves said sprocket, said bat feeding means being positioned to deliver said bat to said mechanism to contact said bars while the same are rounding said sprocket and are in diverged relation, whereby converging movement of said bars when leaving said sprocket serves to grip said bat and to compress portions thereof between said bars longitudinally of the movement of said aprons.

4. A compressing mechanism for compressing a bat of cotton delivered thereto from a feeding means, said mechanism comprising a pair of aprons having their adjacent runs arranged for compressing said bat, a sprocket at one end of one of said aprons about which said apron is trained, said apron comprising a plurality of spaced transverse bars arranged to diverge when said apron rounds said sprocket and to converge when said apron leaves said sprocket, said apron being disposed to approach said other apron as it rounds said sprocket for maximum transverse compression of said bat at the point where said apron leaves said sprocket, said bat feeding means being positioned to deliver said bat to said mechanism to contact said bars while the same are rounding said sprocket and are in diverged relation, said other apron and said bars serving to force portions of said bat into the spaces between said bars as they approach said point of maximum transverse compression and prior to converging movement of said bars, said converging movement of said bars when leaving said sprocket serving to grip said bat and to compress said portions thereof previously forced between said bars, said last mentioned compression of said bat being substantially longitudinal with the direction of movement of said aprons.

5. A compressing mechanism for compressing a bat of cotton delivered thereto from a feeding means, said mechanism comprising a pair of superposed aprons having their adjacent runs arranged for compressing said bat therebetween, a sprocket at one end of one of said aprons about which said apron is trained, said apron comprising a plurality of spaced transverse bars arranged to diverge when said apron rounds said sprocket and to converge when said apron leaves said sprocket, said bat feeding means being positioned to deliver said bat to contact said bars while the same are rounding said sprocket and are in diverged relation, said other apron and said bars as they approach their adjacent runs serving to force portions of said bat between said bars while the same are in diverged relation, whereby converging movement of said bars when leaving said sprocket serves to compress said portions of said bat between said bars longitudinally of the movement of said apron.

6. A compressing mechanism for compressing a bat of cotton delivered thereto from a feeding means, said mechanism comprising a pair of superposed aprons having their adjacent runs arranged in parallelism for compressing said bat therebetween, a sprocket at one end of one of said aprons about which said apron is trained, the other apron being elongated beyond said sprocket a substantial distance to provide a hopper-like throat between the elongated end thereof and that portion of said first mentioned apron disposed around said sprocket, said first mentioned apron comprising a plurality of spaced transverse bars arranged to diverge when said apron rounds said sprocket and to converge when said apron leaves said sprocket, said bat feeding means being positioned to deliver said bat to said hopper-like throat to contact said bars while the same are rounding said sprocket and are in diverged relation, whereby converging movement of said bars when leaving said sprocket serves to grip said bat and to compress portions thereof between said bars longitudinally of the movement of said aprons.

In testimony whereof I have hereunto set my hand.

ALEXANDER S. MACKENZIE.